United States Patent [19]

Lehmann et al.

[11] Patent Number: 5,583,196

[45] Date of Patent: Dec. 10, 1996

[54] MELT FORMED FROM POLYURETHANE AND/OR POLYURETHANE UREA ELASTOMER AND METHOD FOR PRODUCING THE SAME

[75] Inventors: Dieter Lehmann; Matthias Bräuer; Cornelia Bellmann, all of Dresden, Germany

[73] Assignee: Karl Fischer Industrieanlagen GmbH, Germany

[21] Appl. No.: 423,791

[22] Filed: Apr. 18, 1995

Related U.S. Application Data

[63] Continuation-in-part of Ser. No. 11,260, Jan. 29, 1993, abandoned.

[30] Foreign Application Priority Data

Jan. 31, 1992 [DE] Germany ............................ 4203297.0

[51] Int. Cl.$^6$ ............................ C08G 18/38; C08K 5/20
[52] U.S. Cl. ................... 528/49; 528/45; 528/52; 528/59; 528/61; 528/64; 528/65; 528/73
[58] Field of Search .................. 528/45, 49, 52, 528/59, 61, 64, 65, 73

[56] References Cited

U.S. PATENT DOCUMENTS

| | | | |
|---|---|---|---|
| 3,245,961 | 4/1966 | Fetscher et al. | 528/45 |
| 3,557,044 | 1/1971 | Bleasdale et al. | 524/588 |
| 3,565,894 | 2/1971 | D'Amico | 540/601 |
| 3,668,185 | 6/1972 | Boutsicaris | 528/60 |
| 3,721,656 | 3/1973 | Ikeda et al. | 528/61 |
| 3,822,240 | 7/1974 | Schmitt et al. | 528/45 |
| 3,933,759 | 1/1976 | Hoeschele | 528/45 |

FOREIGN PATENT DOCUMENTS

| | | |
|---|---|---|
| 0081701 | 6/1985 | European Pat. Off. . |
| 2842806 | 4/1980 | Germany . |

OTHER PUBLICATIONS

Encyclopedia of Polymer Science and Engineering, vol. 6, 733, 1986, J. Wiley & Sons.
Kolloid–Z. U. Z. Polymere, 241, 1970, pp. 909–915.

*Primary Examiner*—James J. Seidleck
*Assistant Examiner*—Rabon Sergent
*Attorney, Agent, or Firm*—Young & Basile, P.C.

[57] ABSTRACT

A polyurethane and/or polyurethane urea elastomer in the form of a thermostable processable melt, which is immediately processable or which, after cooling and storing, can be remelted and processed. The elastomer is produced by a polyaddition or build-up reaction of longer chain diols with diisocyanate, chain extenders and a polar gelling and/or melting aid for the formation of the thermostable processable melt. A method for manufacturing a polyurethane and/or polyurethane-urea elastomer in the form of a thermally stable processable melt which may be processed immediately or after cooling and storage, being remeltable and reprocessable. The method comprises the steps of: converting n-Mol of a polymeric diol to form a prepolymer with about 1.1 to about 10.0 n-Mol of a diisocyanate at about 50° C. to about 150° C.; adding to the prepolymer between about 1% to about 25% by mass, relative to the prepolymer, of: a polar gel and/or melt auxiliary agent selected from the group consisting of open-chain protic-carboxylic acid amide compounds, cyclic protic carboxylic acid amide compounds and mixtures thereof; and a chain lengthener to form a polymer; heating the polymer to between about 120° C. and about 230° C.; and cooling the polymer.

17 Claims, No Drawings

MELT FORMED FROM POLYURETHANE AND/OR POLYURETHANE UREA ELASTOMER AND METHOD FOR PRODUCING THE SAME

CROSS-REFERENCE TO RELATED APPLICATIONS

This application is a continuation-in-part of U.S. application Ser. No. 08/011,260 filed Jan. 29, 1993, now abandoned.

BACKGROUND OF THE INVENTION

The invention relates to a thermostable melt of polyurethane and/or polyurethane urea elastomer, which can be handled and processed over a long period of time or which, after cooling, can be remelted and thermoplastically processed to shaped articles, such as fibers, threads, flat and molded bodies, or can be used as a hot-melt adhesive.

The invention also relates to a process for producing the melt.

Polyurethane and polyurethane urea elastomers are among the materials which are obtained by means of special production technologies, such as stepwise dosing in a screw machine (DE-OS 28 42 806), reactive injection molding (RIM) processes (EP 81 701), or production and processing in solution (U.S. Pat. Nos. 3,557,044, 3,565,894, 3,721,656).

Whereas thermoplastic polyurethanes can be processed in the melt without significant deterioration of the material characteristics, thermoplastic polyurethane urea elastomers after synthesis cannot be kept in the melt or remelted again. The reason is that the melting point of the polyurethane urea compound is above the decomposition temperature (Kolloid-Z and Z. Polymere, 241, 1970, pp. 909–915).

One important field of use of polyurethane and polyurethane urea elastomers is, for example, that of elastomeric fibers. Polyurethane urea elastomeric fibers are largely produced by dry or wet spinning processes. The melt spinning process is used for special modifications of PU-silk (Encyclopedia of Polymer Science and Engineering, vol. 6, 733, 1986, J. Wiley Interscience). Processes are known for producing elastomer threads by the much less expensive melt spinning technology.

The market leaders are polyurethane urea elastomeric fibers produced by means of solvent, i.e. dry or wet spinning processes, because polyurethane urea elastomers, after synthesis, cannot be kept in the melt or remelted again.

There is consequently a considerable need to make available a processable melt from polyurethane and/or polyurethane urea elastomer which can be processed over a longer synthesis and processing period. It is important for the melt to be handlable without domain formation/phase separation up to the processing to shaped articles or as a hot-melt adhesive or, after cooling and without any deterioration in the material data, can be remelted and processed.

The problem of the present invention is to provide a novel polyurethane and/or polyurethane urea elastomer which allows a problem-free processing of the elastomer to shaped or molded articles, while avoiding the expensive RIM technology or the production and processing of the elastomers in solution with a subsequently costly solvent recovery and disposal.

A process for producing the polyurethane and/or polyurethane urea elastomers is also to be provided.

SUMMARY OF THE INVENTION

The present invention addresses and solves the problems enumerated above. The present invention comprises a polyurethane and/or polyurethane urea elastomer in the form of a thermostable processable melt, which is immediately processable or which, after cooling and storing, can be remelted and processed. The elastomer is produced by a polyaddition or build-up reaction of longer chain diols with diisocyanate, chain extenders and a polar gelling and/or melting aid for the formation of the thermostable processable melt.

A method is disclosed for manufacturing a polyurethane and/or polyurethane-urea elastomer in the form of a thermally stable processable melt which may be processed immediately or after cooling and storage, being remeltable and reprocessable. The method comprises the steps of:

converting n-Mol of a polymeric diol to form a prepolymer with about 1.1 to about 10.0 n-Mol of a diisocyanate at about 50° C. to about 150° C.

adding to the prepolymer between about 1% to about 25% by mass, relative to the prepolymer, of a polar gel and/or melt auxiliary agent selected from the group consisting of open-chain protic carboxylic acid amide compounds, cyclic protic carboxylic acid amide compounds and mixtures thereof and a chain lengthener to form a polymer;

heating the polymer to between about 120° C. and about 230° C.; and cooling the polymer.

DESCRIPTION OF THE PREFERRED EMBODIMENT

According to the invention it is proposed that a polyurethane and/or polyurethane urea elastomer be used for producing shaped articles which, in addition to the prior art components, such as diols, diisocyanates and chain extenders, contains a polar gelling and/or melting aid. As a result of this development, according to the invention, a thermoplastically processable melt is formed, which is either immediately processable or, after cooling and storing, can be remelted and processed. The polar gelling and/or melting aid is added to the hard or rigid segments in the polyurethane and/or polyurethane urea elastomer before or with the start of phase separation/domain formation so that a thermostable processable melt is obtained. Without being bound to any theory, it is believed that this gelling and/or melting aid is incorporated into the hard segment domains as a result of its polar character. The preferred gelling and/or melting aid used is a carboxylic acid amide and particular preference is given to ε-caprolactam.

It is also preferable to form a thermostable processable melt from polyurethane and/or polyurethane urea elastomer comprising dihydroxypolyether and/or dihydroxypolyester and unmasked diisocyanate in pure form or as a diisocyanate mixture and aliphatic dihydroxy compound or compounds and/or aliphatic and/or aryl aliphatic hydroxamine compound or compounds without phenol groups and/or aliphatic and/or aryl aliphatic and/or aromatic diamine compound or compounds in pure form or as a mixture as a chain extender by adding a polar gelling or melting aid in the form of carboxylic acid amine or amides before or with the start of phase separation/domain formation to the hard segments in the polyurethane and/or polyurethane urea elastomer. The elastomers can be kept thermostable in the melt by shearing and disturbing the hard segment formation by the gelling or melting aid. This melt is preferably processed immediately following synthesis. However, after cooling and storage, the elastomer melt can be remelted and processed under clearly defined conditions.

The cooling of the melt should take place as rapidly as possible as a function of the inclination/speed to phase separation/domain formation in order to freeze the metastable state. The cooled elastomer melt should be stored for a long period preferably at temperatures below the melting point and preferably below the glass transition point Tg. The chain mobility of the elastomers above the Tg, as a function of the tendency to phase separation/domain formation, leads with varying speed to the displacement from the metastable to the stable state, which is more difficult to bring into the melt or, as in the case of polyurethane urea elastomers, which can no longer be brought into a melt. The stability of this metastable state is to be individually determined as a function of the temperature and for each elastomer system as a function of the chemical structure and composition.

According to the invention, the polar gelling or melting aids are preferably added open-chain or cyclic protic carboxylic acid amide compounds in pure form or as a mixture and optionally mixed with aprotic dipolar solvents, which are thermostable under these processing conditions, such as, for example, the aprotic dipolar carboxylic acid amide N,N-dimethyl acetamide. Dimethyl formamide as an additive has a lower thermal stability and can consequently only be used to a limited extent. Further compounds which can be added are phenols or thermostable protic sulphonamides. The decisive criterion for the use of such protic compounds or, when used, masked diisocyanates is, apart from the thermostability of the compounds or the diisocyanate masking agent, the recleaving temperature from the addition bond between the isocyanate groups and protic carboxylic acid amide and/or protic compounds, which are to be at least 10° Kelvin lower than the lowest recleaving temperature of the urethane bonds between the isocyanate groups and hydroxy groups in a prepolymer and in the polyurethane and/or polyurethane urea elastomer.

N-monosubstituted and/or N-unsubstituted carboxylic acid amides are used as protic carboxylic acid amide compounds. Apart from open-chain, these also include the cyclic protic carboxylic acid amides such as lactams and pyrrolidones and preferably use is made of ε-caprolactam in a quantity such that the proportion of the polar gelling or melting aid is 1 to 25% and preferably 3 to 15% by weight in the reaction system.

The invention also relates to a process for producing the elastomer. For this purpose, according to the invention, during the production of polyurethane and/or polyurethane urea elastomers according to the known processes a gelling and/or melting aid is added.

The addition of the polar gelling or melting aid preferably takes place before and/or simultaneously with the addition of the chain extender in the polyaddition/polymer build up reaction to the polyurethane and/or polyurethane urea elastomer.

The advantage of this process is the thermoplastic processability of the polyurethane and/or polyurethane urea elastomers. This processing can take place immediately following elastomer synthesis. The completely reacted melt is further processed without delay by extrusion, injection molding or melt spinning so as to form shaped articles.

Synthesis or processing can also take place in two separate stages. In this case granules are produced from the completely reacted melt through cooling and are storable or transportable over long distances. In the second stage the granules are melted again and further processed to shaped articles by extrusion, injection molding or melt spinning.

As a function of the intended use of the elastomers, the gelling or melting aid can be completely or partly eliminated during or after shaping, e.g. by extraction, or it can be left in the elastomer product.

To the elastomer product are added, in accordance with the further processing or intended use, known adjuvants and/or additives, such as, for example, plasticizers, lubricants, light stabilizers, thermostabilizers, oxidation stabilizers, flame-proofing agents, dyes and/or pigments, organic and/or inorganic fillers and/or reinforcing agents. This can take place both before or during elastomer melt processing. Details on these materials are, for example, provided in B. V. Falkai, "Synthesefasen" Verlag Chemi, 1981; Becker, , Braun, "Kunststoffhandbuch", part VI, Carl-Hanser-Verlag Munich/Vienna, 1983; and DE-OS 39 11 725.

The invention also relates to a process for producing shaped articles, such as fibers, threads, flat and molded articles. According to the invention, for the production of the shaped articles, use is made of a polyurethane and/or polyurethane urea elastomer, in the manner described hereinbefore. During the production of the shaped articles, the invention incorporates all known processes, such as extrusion, injection molding or melt spinning. According to the invention, the production of the shaped articles can take place directly after elastomer synthesis, in which case the completely reacted melt is immediately further processed by one of the aforementioned processes, or initially the completely reacted melt is cooled and converted into granules. It is particularly advantageous that. the granules are storage-stable and can therefore be stored over long periods without any deterioration of their characteristics. In a second stage the granules are remelted and can be further processed to the shaped articles by the aforementioned processes.

The invention finally also relates to the use of polar carboxylic acid amides as gelling and/or melting aids in polyurethane and/or polyurethane urea elastomers.

A method is disclosed for manufacturing a polyurethane and/or polyurethane-urea elastomer in the form of a thermally stable processable melt which may be processed immediately or after cooling and storage, being remeltable and reprocessable. The method comprises the steps of:

converting n-Mol of a polymeric diol to form a prepolymer with about 1.1 to about 10.0 n-Mol of a diisocyanate at about 50° C. to about 150° C.;

adding to the prepolymer between about 1% to about 25% by mass, relative to the prepolymer, of a polar gel and/or melt auxiliary agent selected from the group consisting of open-chain protic carboxylic acid amide compounds, cyclic protic carboxylic acid amide compounds and mixtures thereof, and a chain lengthener to form a polymer;

heating the polymer to between about 120° C. and about 230° C.; and cooling the polymer.

In the preferred embodiment, a gel and/or melt auxiliary agent is used whose re-separation temperature from the addition bond in between the isocyanate group and carboxylic acid amide is at least 10 Kelvin lower than the lowest re-separation temperature of the urethane bond between isocyanate groups and hydroxy groups in the prepolymer and in the polyurethane and/or polyurethane urea elastomer.

It is further preferred that N-mono and/or N-unsubstituted carboxylic acid amides are used as the gel and/or melt auxiliary agent; and still further preferred that ε-caprolactam is used as a carboxylic acid amide compound.

In the preferred embodiment, the proportion of the polar gel and/or melt auxiliary agent is between about 3% and about 15% by mass in the reaction system.

It is preferred that dihydroxy polyether and/or dihydroxy polyester are used as diols; and that uncapped and/or capped diisocyanate or mixtures thereof are used as diisocyanate.

Still further in the preferred method, aliphatic dihydroxy compounds and/or aliphatic and/or arylaliphatic hydroxyl amine compounds without phenol groups and/or aliphatic and/or arylaliphatic and/or aromatic diamine compounds or mixtures thereof are used as chain lengtheners.

After cooling of the melt, the method of the present invention may further comprise the step of storing the polyurethane and/or polyurethane urea elastomer over a lengthy, indeterminate or predetermined period of time at temperatures below the melting point, and preferably below the second order transition temperature $T_g$.

The invention is explained in greater detail hereinafter by means of six examples.

EXAMPLE 1: prepolymer synthesis

At 80° C. and under inert conditions (ultra-pure nitrogen/H O freedom) n mole of polytetrahydrofuran (polyol 2000) and 1.8 n mole of a) 4,4'-diphenyl methane diisocyanate (MDI) or
b) hexamethylene diisocyanate are melted and stirred. To the resulting prepolymer are added
c) 5% by weight or
d) 7.5% by weight or
e) 10% by weight or
f) 15% by weight of ε-caprolactam and, at 120° C., 0.8 n mole of
g) 1,4-butane diol or
h) ethanol amine or
i) 1.2-ethylene diamine or
j) 1,4-butylene diamine or
k) 1,6-hexamethylene diamine or
l) 4,4-diaminodiphenyl methane
m) 2,4/2,6-toluylene diamine
n) p-phenylene diamine
o) m-phenylene diamine are dosed in and homogenized. This prepolymer can be stored at ambient temperature under inert conditions.

EXAMPLE 2

The prepolymers of example 1, batches b/c to f/g to o are successively reacted in the reaction vessel under intense stirring and the raising of the temperature to 180° to 200° C. so as to form a polyurethane or polyurethane urea elastomer melt. After cooling and remelting, the products form a homogeneous melt, which can be further processed to shaped articles or used as hot-melt adhesives.

EXAMPLE 3

The prepolymers of example 1, batches a/c to f/g to o and b/c to f/g to o are successively melted in a Brabender kneader at 50 r.p.m. and reacted to the polyurethane or polyurethane urea elastomer melt, accompanied by a temperature rise to 180° to 200° C. After cooling and remelting, the products form a melt, which can be further processed to shaped articles or used as a hot-melt adhesive.

EXAMPLE 4

The prepolymers of example 1, batches a/c to f/g to o and b/c to f/g to o, are successively heated in a cylindrical vessel with plunger to 180° to 200° C. and the resulting polyurethane or polyurethane urea elastomer melt is molded with or without degassing by plunger displacement to shaped articles.

EXAMPLE 5

The prepolymers of example 1, batches a/c to f/g to k and b/c to f/g to o are successively reacted at temperatures up to 210° C. in a single-screw extruder and immediately processed to shaped articles or used as hot-melt adhesives. After cooling the melt, the elastomer products can be processed by further melting and extrusion or injection molding.

EXAMPLE 6

The prepolymers of example 1, batches a/c to f/g to k and b/c to f/g to o are successively reacted in a twin-screw extruder at temperatures up to 210° C. and immediately processed to shaped articles or used as hot-melt adhesives. After cooling the melt, the elastomer products can also be processed following remelting and extrusion or injection molding.

In accordance with example 1, the hard segment portions are varied (increased) in selected batches, while respecting the equivalence ratios of the terminal groups.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A method of manufacturing a polyurethane and/or polyurethane-urea elastomer in the form of a thermally stable processable melt which is processable immediately, or after cooling and storage, is remeltable and reprocessable, the method comprising the steps of:

converting n-Mol of a polymeric diol to form a prepolymer with about 1.1 to about 10.0 n-Mol of a diisocyanate at about 50° C. to about 150° C.;

adding to the prepolymer between about 1% to about 25% by mass, relative to the prepolymer, of a polar gel and/or melt auxiliary agent selected from the group consisting of open-chain protic carboxylic acid amide compounds, cyclic protic carboxylic acid amide compounds and mixtures thereof;

adding a chain lengthener to form a polymer having a melting point and a decomposition temperature, the polar gel and/or melt auxiliary agent lowering the melting point of the polymer below the decomposition temperature;

heating the polymer to between about 120° C. and about 230° C.; and cooling the polymer.

2. The method as defined in claim 1 wherein a gel and/or melt auxiliary agent is used whose re-separation temperature from the addition bond between the isocyanate group and carboxylic acid amide is at least 10 Kelvin lower than the lowest re-separation temperature of the urethane bond between isocyanate groups and hydroxy groups in the prepolymer and in the polyurethane and/or polyurethane urea elastomer.

3. The method as defined in claim 1 wherein N-unsubstituted carboxylic acid amides are used as the gel and/or melt auxiliary agent.

4. The method as defined in claim 1 wherein ε-caprolactam is used as a carboxylic acid amide compound.

5. The method as defined in claim 1 wherein the proportion of the polar gel and/or melt auxiliary agent is between about 3% and about 15% by mass, relative to the prepolymer, in the reaction system.

6. The method as defined in claim 1 wherein dihydroxy polyether and/or dihydroxy polyester are used as diols.

7. The method as defined in claim 1 wherein uncapped and/or capped diisocyanate are used as diisocyanate.

8. The method as defined in claim 1 wherein aliphatic dihydroxy compounds and/or aliphatic and/or arylaliphatic hydroxyl amine compounds without phenol groups and/or aliphatic and/or arylaliphatic and/or aromatic diamine compounds are used as chain lengtheners.

9. The method as defined in claim 1 wherein, after cooling of the melt, the polyurethane and/or polyurethane urea elastomer is storage-stable at temperatures below its melting point.

10. The method as defined in claim 9 wherein, after cooling of the melt, the polyurethane and/or polyurethane urea elastomer is storage-stable at temperatures below its second order transition temperature $T_g$.

11. A polyurethane and/or polyurethane urea elastomer in the form of a thermally stable processable melt produced by the method of claim 1.

12. A method of manufacturing a polyurethane and/or polyurethane-urea elastomer in the form of a thermally stable processable melt which is processable immediately or after cooling and storage, is remeltable and reprocessable, the method comprising the steps of:

converting n-Mol of a polymeric diol to form a prepolymer with about 1.1 to about 10.0 n-Mol of a diisocyanate at about 50° C. to about 150° C. wherein dihydroxy polyether and/or dihydroxy polyester are used as diols, and wherein uncapped and/or capped diisocyanate are used as diisocyanate;

adding to the prepolymer between about 1% to about 25% by mass, relative to the prepolymer, of a polar gel and/or melt auxiliary agent selected from the group consisting of open-chain protic carboxylic acid amide compounds, cyclic protic carboxylic acid amide compounds and mixtures thereof, wherein a gel and/or melt auxiliary agent is used whose re-separation temperature from the addition bond between the isocyanate group and carboxylic acid amide is at least 10 Kelvin lower than the lowest re-separation temperature of the urethane bond between isocyanate groups and hydroxy groups in the prepolymer and in the polyurethane and/or polyurethane urea elastomer;

adding a chain lengthener to form a polymer having a melting point and a decomposition temperature, the polar gel and/or melt auxiliary agent lowering the melting point of the polymer below the decomposition temperature, wherein aliphatic dihydroxy compounds and/or aliphatic and/or arylaliphatic hydroxyl amine compounds without phenol groups and/or aliphatic and/or arylaliphatic and/or aromatic diamine compounds are used as the chain lengtheners;

heating the polymer to between about 120° C. and about 230° C.; and cooling the polymer;

wherein, after cooling, the polyurethane and/or polyurethane urea elastomer is storage-stable at temperatures below its melting point.

13. The method as defined in claim 12 wherein N-unsubstituted carboxylic acid amides are used as the gel and/or melt auxiliary agent.

14. The method as defined in claim 13 wherein ε-caprolactam is used as a carboxylic acid amide compound.

15. The method as defined in claim 12 wherein the proportion of the polar gel and/or melt auxiliary agent is between about 3% and about 15% by mass, relative to the prepolymer, in the reaction system.

16. The method as defined in claim 12 wherein, after cooling of the melt, the polyurethane and/or polyurethane urea elastomer is storage-stable at temperatures below its second order transition temperature $T_g$.

17. A polyurethane and/or polyurethane urea elastomer in the form of a thermally stable processable melt produced by the method of claim 12.

* * * * *